United States Patent
Hughes et al.

(10) Patent No.: US 6,484,029 B2
(45) Date of Patent: Nov. 19, 2002

(54) APPARATUS AND METHODS FOR ADAPTING MOBILE UNIT TO WIRELESS LAN

(75) Inventors: John K Hughes; Gurpreet Singh, both of San Jose, CA (US)

(73) Assignee: Symbol Technologies, Inc., Holtsville, NY (US)

(*) Notice: Subject to any disclaimer, the term of this patent is extended or adjusted under 35 U.S.C. 154(b) by 0 days.

(21) Appl. No.: 09/172,180

(22) Filed: Oct. 13, 1998

(65) Prior Publication Data

US 2001/0041568 A1 Nov. 15, 2001

(51) Int. Cl.⁷ .............................. H04Q 7/20; H04Q 7/24; H04B 1/38
(52) U.S. Cl. ................... 455/434; 455/456; 455/454; 455/435; 455/552; 455/522; 455/62; 370/338; 370/908; 370/245
(58) Field of Search ................. 455/456, 434, 455/435, 454, 552, 556, 524, 525, 522, 62, 517, 515, 509; 370/908, 245, 338, 313, 329

(56) References Cited

U.S. PATENT DOCUMENTS

| | | | |
|---|---|---|---|
| 5,029,183 A | | 7/1991 | Tymes ........................ 375/1 |
| 5,442,805 A | * | 8/1995 | Sagers et al. ............... 455/575 |
| 5,635,940 A | * | 6/1997 | Hickman et al. ........... 342/389 |
| 5,652,782 A | | 7/1997 | Hughes-Hartogs ........... 379/29 |
| 5,668,803 A | | 9/1997 | Tymes et al. ............... 370/312 |
| 5,732,349 A | * | 3/1998 | Sanpei et al. ............... 455/435 |
| 5,819,173 A | | 10/1998 | Lawrence et al. .......... 455/414 |
| 5,857,155 A | * | 1/1999 | Hill et al. ................... 455/456 |
| 5,905,955 A | * | 5/1999 | Bamburak et al. .......... 455/434 |
| 5,918,159 A | * | 6/1999 | Foumkong et al. ........ 455/38.1 |
| 5,983,115 A | * | 11/1999 | Mizikovsky ................ 455/512 |
| 6,031,830 A | | 2/2000 | Cowan ....................... 370/338 |
| 6,035,212 A | * | 3/2000 | Rostoker et al. ........... 455/552 |

* cited by examiner

Primary Examiner—Tracy Legree

(57) ABSTRACT

A method and apparatus for automatically adapting a mobile unit to the communications requirements of a particular country or geographic region is provided. A wireless data communication network located in a particular country or geographic region includes one or more access points for communicating with the mobile unit. The mobile unit receives from an access point an announcement message broadcast. The message has a unique frequency characteristic associated with the geographic location of the access point from which it was broadcast. The mobile unit then determines an allowable frequency set for use in the country or geographic location associated with the access point. The mobile unit adjusts its frequency set to operate o the allowable frequency set. The mobile unit may also adjust others of its operating parameters in a similar fashion.

42 Claims, 2 Drawing Sheets

APPARATUS AND METHODS FOR ADAPTING MOBILE UNIT TO WIRELESS LAN

CROSS-REFERENCE TO RELATED APPLICATIONS

This application is related to copending U.S. patent application Ser. No. 08/747,034, entitled Power-saving Arrangement and Method for Mobile Units in Communications Network, filed Oct. 27, 1995, issued as U.S. Pat. No. 6,002,918 on Dec. 14, 1999 for inventors F. Heiman, P. Pinard, A. Werback and M. Shiba; herein expressly incorporated by reference.

BACKGROUND OF THE INVENTION

1. Field of the Invention

The invention relates to data communication systems, and more particularly to a wireless local area network (LAN) communication system in which mobile units associate with stationary access points having communications characteristics defined by the particular country in which the LAN is installed.

2. The Background Art

A wireless LAN may be implemented by remote mobile units that send messages to and receive messages from base stations or Stationary Access Points using wireless infrared or radio communication links. Each Stationary Access Point covers a limited area, so a typical network may have several Stationary Access Points.

One protocol that may be used is the IEEE 802.11 Standard that defines physical and data link layers for wireless local networks. The standard defines, among other things, the wireless LAN medium access control (MAC) and physical (PHY) layer specifications.

For a message to be transmitted, a mobile unit first becomes associated with a Stationary Access Point. Association refers to the process of synchronizing a mobile unit with a Stationary Access Point for communication, and is initiated by the mobile unit. The mobile unit first listens to the broadcasts over the airwaves and determines which Stationary Access Points are within range of the mobile unit, and then requests association with a particular Stationary Access Point according to certain criteria. At any point in time, a mobile unit is typically associated with only one Stationary Access Point. A single Stationary Access Point can be associated with multiple mobile units.

With the ever-growing global market, it is common for users to travel from country to country. A problem therefore occurs, in that one country may allocate a different portion of the frequency spectrum to wireless communications than another country. Additionally, different countries may have different regulations regarding power output of wireless communications. These allocations and regulations may prevent a mobile unit which is designed for use in one country from working (or being allowed to work) in another country.

What is needed, then, is a system and method for allowing a mobile unit to meet regulatory requirements and adapt to and communicate with Stationary Access Points having different communication characteristics.

BRIEF DESCRIPTION OF THE INVENTION

The present invention relates to an apparatus and a method for automatically adapting a mobile unit to communication requirements of a particular country or geographic region. To achieve this capability, a method operates on a wireless data communications network including a mobile unit and one or more access points, wherein the method includes the steps of: receiving in the mobile unit announcement messages broadcast by one or more of the access points, each of said messages having a unique frequency characteristic associated with the geographic location of the access point from which it was sent; determining, in said mobile unit, an allowable frequency set in the geographic region associated with the access point from which each of said messages was sent; and adjusting the frequency set of the mobile unit to send messages on said allowable frequency set. The invention may then adjust other operating characteristics in a similar fashion.

BRIEF DESCRIPTION OF THE DRAWING FIGURES

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

Figure 1:
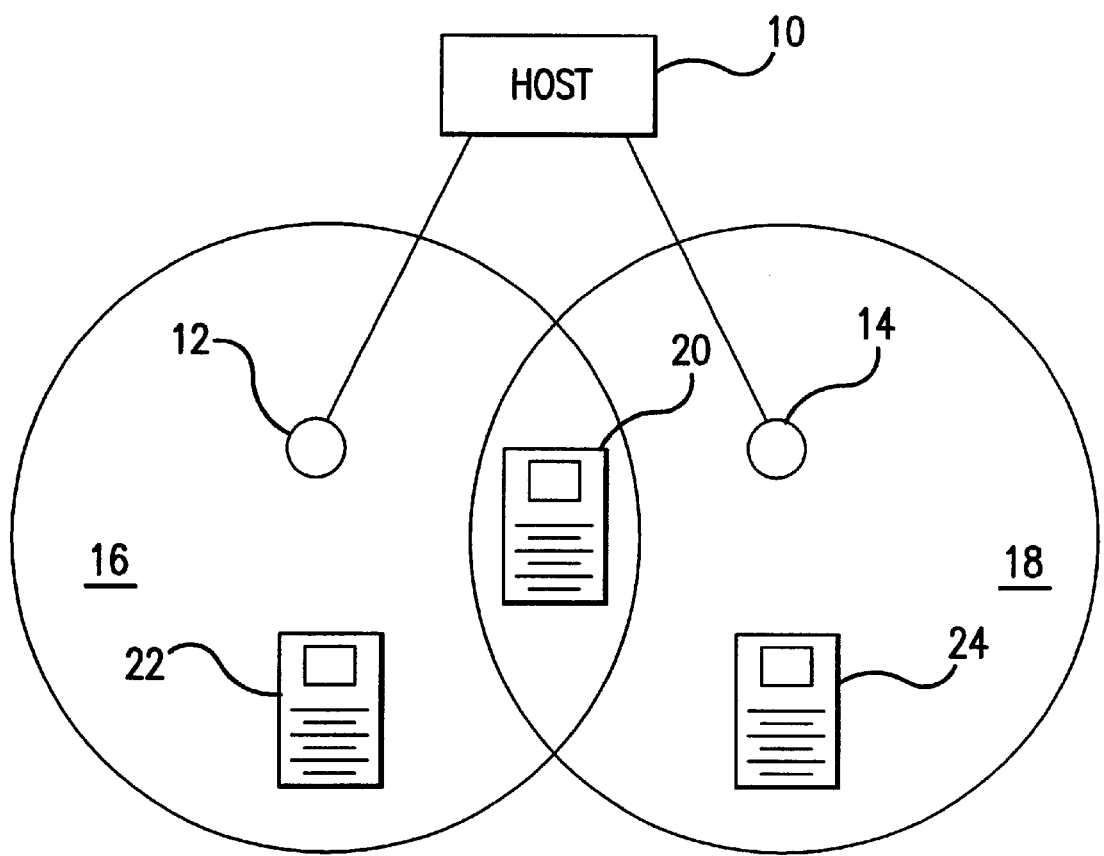
FIG. 1 is a block diagram showing a wireless network architecture.

FIG. 1 is a block diagram showing a wireless network architecture. Host 10 is connected to Stationary Access Point 12 and Stationary Access Point 14. Stationary Access Point 12 handles wireless communications within area 16, and Stationary Access Point 14 handles communications within area 18. As shown in FIG. 1, therefore, Stationary Access Point 12 is in communication range of mobile unit 20 and mobile unit 22, and Stationary Access Point 14 is in communication range of mobile unit 20 and mobile unit 24. Mobile unit 20 is in communication range of either Stationary Access Point 12 or Stationary Access Point 14, although mobile unit 20 preferably only communicates with one of them at a time.

In one scenario, mobile unit 20 associates with a Stationary Access Point, for example Stationary Access Point 12, and thereafter communicates with Stationary Access Point 12 to transmit messages to the host or to other mobile units. If mobile unit 20 is associated with Stationary Access Point 12, mobile unit 20 could transmit a message to mobile unit 22 via Stationary Access Point 12, or to mobile unit 24 via Stationary Access Point 12, host 10, and Stationary Access Point 14.

In a preferred embodiment of the invention, a grouping of hosts and/or mobile units make up a wireless local area network (LAN).

Systems similar to the one depicted in FIG. 1 are found throughout the world. Each system, however, typically has different operating parameters in each country. According to a preferred embodiment of the present invention, a mobile unit is designed which may operate at a variety of different frequencies. The range of frequencies should be large enough to encompass some of the frequencies available for wireless communications in each country or geographic region in which the mobile unit may operate. Additionally, the mobile unit is designed to operate at a variety of different power settings, again with the range of power settings large enough to encompass at least some allowable power settings in each country in which the mobile unit may operate. These features allow the mobile unit to operate in a variety of different countries or geographic regions.

Figure 2:
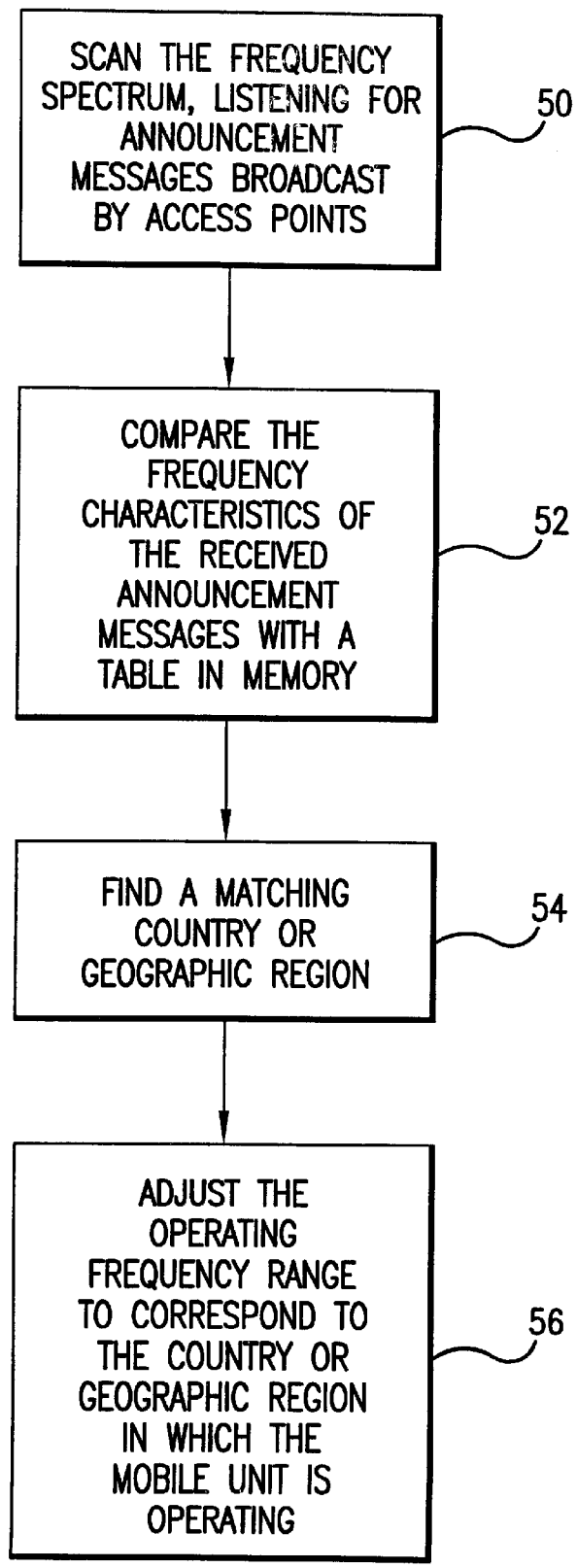
FIG. 2 is a flow diagram illustrating a method for operating a wireless data communications network according to a presently preferred embodiment of the present invention.

Furthermore, the mobile unit is designed to automatically configure itself for use in individual countries or geographic regions. This may be accomplished by running a program or method contained in either software or hardware within the mobile unit. FIG. 2 is a flow diagram illustrating the method according to a preferred embodiment of the present invention. At step 50, the mobile unit scans the frequency spectrum, listening for announcement messages broadcast by access points. This may encompass tuning to each available frequency until an announcement message from a nearby access point is received. The announcement message will have a frequency characteristic that is unique to a particular geographic region or country.

At step 52, the frequency characteristics of the received announcement message are compared with a table or equivalent data structure contained in memory. The table may contain a listing of the breakdown of the frequency spectrum for all the different available countries or geographic regions. It also may list regulations on power output or other regulations important to the functioning of the mobile unit. At step 54, a matching country or geographic region is found. At this point, the mobile unit has determined what country or geographic region in which it is operating. At step 56, the mobile unit adjusts its operating frequency range to correspond to the country or geographic region in which it is operating. It may also alter other operating characteristics, such as power output and modulation type, in accordance with the regulations listed in the table or other data structure corresponding to the country in which the unit is located.

After the geographic region frequency and power settings (and any other operating characteristics) have been adapted for use in the country or geographic region in which the unit is located, the mobile unit operates similarly to a conventional mobile unit.

Some regulations require that the regulations themselves be displayed to the user. Normally, these regulations would be placed on the outer surface of a unit capable of transmitting in the country. However, since the unit of the present invention may be capable of transmission in many different countries, the surface area may be inadequate for a comprehensive label. Therefore, the unit may be configured such that, after the unit has determined the country in which it is located, the proper regulatory information is displayed to the user.

Referring back to FIG. 1, Stationary Access Point 12, Stationary Access Point 14, and host 10 may be implemented in hardware or software or a combination of hardware and software. Mobile unit 22, mobile unit 20 and mobile unit 24 may be implemented as programmable processor-based units executing software modules. An embodiment of the process performed by the software modules is described below. In one embodiment, mobile units 20, 22 and 24 are hand-held data-gathering units.

The contents of U.S. Pat. No. 5,029,183 to Tymes, and U.S. Pat. No. 5,668,803 to Tymes et al., both assigned to Symbol Technologies, Inc., are hereby incorporated by reference herein. These patents show systems in which methods and apparatus consistent with the principles of the present invention may be practiced. Each patent describes a system in which hand-held data-gathering mobile units communicate via wireless link with Stationary Access Points, similar to the system shown in FIG. 1.

In another embodiment of the present invention, the mobile unit may be configured so that the user must verify the country in which they are located. For example, if the mobile unit determines through looking at the table that it is currently located in Switzerland, a message may appear on a display screen on the mobile unit saying "You are in Switzerland. Is this correct? (Y/N)". The user may then be required to confirm the identified location in Switzerland before the mobile unit reconfigures its settings to comply with Swiss standards. This reduces the chance of the unit mistakenly configuring itself to specific characteristics which may violate certain regulations.

In another embodiment of the present invention, a Global Positioning System (GPS) locator may be built into the mobile unit, allowing the unit to verify its location instead of or in addition to requiring confirmation from the user. This feature also reduces the chance of the unit mistakenly configuring itself to specific characteristics which may violate certain regulations.

In another embodiment of the present invention, the multiple geographic region feature (the feature embodied by the above methods) may be enabled or disabled by a user. When the feature is disabled, the mobile unit merely attempts to establish communication using a communication setting for a particular geographic region. This setting may be, for example, a default setting or the setting in use at the time the mobile unit was last turned off.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for operating a wireless local area network for a mobile unit the networks having one or more access points, said method comprising:

receiving a message in the mobile unit, wherein said message is broadcast by an access point of the one or more of access points, said message having a unique frequency spectrum associated with a physical geographic region associated with said access point from which said message was broadcast;

determining, in the mobile unit from said message, an allowable frequency set within said physical geographic region; and adjusting a tuned frequency set of the mobile unit to coincide with said allowable frequency set such that said mobile unit is configured to operate in a wireless local area network.

2. The method of claim 1, wherein said determining step further includes:

comparing said unique frequency spectrum of said message to a table stored in memory, said table containing a list of a plurality of allowable frequency sets corresponding to a plurality of recorded geographic regions;

matching said unique frequency spectrum to said allowable frequency set in said table; and associating said allowable frequency set corresponding to a physical geographic region associated with said access point.

3. The method of claim 2, wherein said table further includes a list of a plurality of allowable power output levels corresponding to said plurality of recorded geographic regions.

4. The method of claim 3, further including:
comparing a power setting of said message to said table;
matching said power setting to an allowable power output range in said table;
associating said allowable power output range corresponding to said physical geographic region; and
adjusting an operational power output level of the mobile unit to operate within said allowable power output range.

5. The method of claim 2, wherein said table further includes a listing of a plurality of regulations corresponding to said plurality of recorded geographic regions.

6. The method of claim 5, further including:
displaying to a user a regulation in said plurality of said regulations, said regulation associated with the physical geographic region in which the unit is located.

7. The method of claim 6, further including:
associating said regulation corresponding to said physical geographic region; and
adjusting a plurality of operating settings of the mobile unit to comply with said regulation.

8. The method of claim 1, wherein the mobile unit is a hand-held data gathering device.

9. The method of claim 1, further including:
prompting a user to verify that an identified geographic region determined by the mobile unit is correctly associated with said access point; and
transmitting if said user verifies said identified geographic region.

10. The method of claim 1, further including:
utilizing a Global Positioning System locator to verify said physical geographic region in which the mobile unit is located; and
transmitting if said Global Positioning System locator verifies an identified geographic region determined by the mobile unit is correctly associated with said access point.

11. The method of claim 1, wherein a user may disable any of said receiving, determining, and adjusting.

12. A method for operating a mobile unit on an operating frequency, said mobile unit designed for use in a wireless local area network and located in a physical geographic region, said method comprising:
scanning a frequency spectrum to detect an announcement message from an access point in the physical geographic region;
examining a frequency spectrum of said announcement message;
comparing said frequency spectrum with a table in memory, said table listing a plurality of recorded geographic regions;
selecting an identified geographic region listed in said table to correspond to the physical geographic region by matching said frequency spectrum with said identified geographic region listed in said table, said table also listing a frequency range for each recorded geographic region; and
adjusting the operating frequency of the mobile unit to correspond with said frequency range corresponding to the physical geographic region such that said mobile unit is configured to operate in a wireless local area network.

13. The method of claim 12, wherein said table further includes a list of allowable power output levels corresponding to said each recorded geographic region.

14. The method of claim 13, further including adjusting an operating power output level of the mobile unit to correspond with said allowable power output levels corresponding to the physical geographic region.

15. The method of claim 12, wherein said table further includes a list of regulations corresponding to said each recorded geographic region.

16. The method of claim 15, further including:
displaying to a user said regulations corresponding to the physical geographic region in which the unit is located.

17. The method of claim 15, further including adjusting an operating setting of the mobile unit to correspond with said regulations associated with the physical geographic region.

18. The method of claim 12, wherein the mobile unit is a hand-held data gathering device.

19. The method of claim 12, further including:
prompting a user to verify that an identified geographic region determined by the mobile unit correctly corresponds to the physical geographic region; and
transmitting if said user verifies that said identified geographic region.

20. The method of claim 12, further including:
utilizing a Global Positioning System locator to verify the physical geographic region in which the mobile unit is located;
transmitting if said Global Positioning Sensor locator verifies that an identified geographic region determined by the mobile unit is equivalent to the physical geographic region in which the mobile unit is located.

21. The method of claim 12, wherein a user may disable any of said scanning, examining, comparing, selecting and adjusting.

22. A mobile unit for use in a wireless local area network that includes one or more access points, wherein the frequency set of the mobile unit may be modified and the mobile unit includes:
a receiver which receives one or more messages correspondingly broadcast by the one or more the access points in the network, each of said one or more messages having a unique frequency spectrum associated with a physical geographic location corresponding to an access point from which said one or more messages is broadcast;
a processing unit, which determines from said unique frequency spectrum an allowable frequency set in said physical geographic region associated with said access point; and
a frequency set adjuster, which adjusts a tuned frequency set to coincide with said allowable frequency set such that said mobile unit is configured to operate in a wireless local area network.

23. The mobile unit of claim 22, wherein said processing unit includes:
a comparator, which compares said unique frequency spectrum of said one or more messages to a table stored in memory, said table containing a list of allowable frequency sets for corresponding to a plurality of geographic regions;
a matcher, which matches said unique frequency spectrum to said allowable frequency set in said table; and
a frequency reader, which refers to said allowable frequency set corresponding to said physical geographic regions.

24. The mobile unit of claim 23, wherein said table further includes a list of allowable power output levels corresponding to said plurality of recorded geographic regions.

25. The mobile unit of claim 24, wherein the power output level of the mobile unit may be adjusted and the mobile unit includes:

a power reader, which associates said allowable power output range corresponding to said physical geographic region; and a power output level adjuster, which adjusts a power output level of the mobile unit to operate within said allowable power output range.

26. The mobile unit of claim 23, wherein said table further includes a listing of a plurality of regulations corresponding to said plurality of geographic regions.

27. The mobile unit of claim 26, further including:

a display, which displays to a user a regulations set in said listing corresponding to said physical geographic region in which the unit is located.

28. The mobile unit of claim 26, wherein a plurality of operating characteristics of the mobile unit may be adjusted and the mobile unit includes:

a regulation reader, which refers to said regulations corresponding to said physical geographic region; and an operating setting adjuster, which adjust the plurality of operating settings of the mobile unit to comply with said regulations.

29. The mobile unit of claim 22, wherein the mobile unit is a hand-held data gathering device.

30. The mobile unit of claim 22, further including:

a display, which prompts a user to verify that an identified geographic region determined by the mobile unit corresponds with said physical geographic region containing the access point; and a wireless transmitter, which transmits if said user verifies that said identified geographic region corresponds with said physical geographic region.

31. The mobile unit of claim 22, further including:

a Global Positioning System locator, which verifies said physical geographic region in which the mobile unit is located; and a wireless transmitter, which transmits if said physical geographical region verified by said Global Positioning System locator matches said identified geographic region that the mobile unit determines is associated with said access point.

32. The mobile unit of claim 22, wherein a user may disable any of said receiver, said processing unit and said frequency set adjuster.

33. A mobile unit for use in a wireless local area network, the mobile unit located in a physical geographic region and including:

a frequency scanner, which scans a frequency spectrum to detect an announcement message from an access point;

a frequency spectrum detector, which examines a frequency spectrum of said announcement message;

a comparator, which compares said frequency spectrum with a table in memory, said table listing a plurality of recorded geographic regions;

a determiner, which selects an identified geographic region listed in said table to correspond to the physical geographic region by matching said frequency spectrum with said identified geographic region listed in said table. said table also listing a frequency range for each recorded geographic region; and a frequency adjuster, which adjusts the operating frequency of the mobile unit to correspond with said frequency range corresponding to the physical geographic region such that said mobile unit is configured to operate in a wireless local area network.

34. The mobile unit of claim 33, wherein said table further includes a list of allowable power output levels corresponding to each recorded geographic region.

35. The mobile unit of claim 33, further including a power output adjuster, which adjusts an operating power output level of the mobile unit to correspond with said allowable power output levels corresponding to the physical geographic region.

36. The mobile unit of claim 33, wherein said table further includes a list of regulations corresponding to each recorded geographic region.

37. The mobile unit of claim 36, further including:

a display, which displays to a user said regulations corresponding to the physical geographic region in which the unit is located.

38. The mobile unit of claim 36, further including an operating setting adjuster, which adjusts an operating setting of the mobile unit to correspond with said regulations associated with the physical geographic region.

39. The mobile unit of claim 33, wherein the mobile unit is a hand-held data gathering device.

40. The mobile unit of claim 33, further including: a display, which prompts a user to verify that an identified geographic region determined by the mobile unit corresponds with said physical geographic region containing the access point; and a wireless transmitter, which transmits if said user verifies that said identified geographic region corresponds with said physical geographic region.

41. The mobile unit of claim 33, further including:

a Global Positioning System locator, which verifies said physical geographic region in which the mobile unit is located; and a wireless transmitter, which transmits if said physical geographical region verified by said Global Positioning System locator matches said identified geographic region determined by the mobile unit.

42. The mobile unit of claim 33, wherein a user may disable any of said frequency scanner, said frequency spectrum detector, said comparator, said determiner, and said frequency adjuster.

* * * * *